(12) United States Patent
Oishi et al.

(10) Patent No.: US 11,180,612 B2
(45) Date of Patent: Nov. 23, 2021

(54) TRIAZINE RING-CONTAINING POLYMER, AND THERMOPLASTIC ARTICLE AND OPTICAL COMPONENT INCLUDING THE SAME

(71) Applicant: SAMSUNG ELECTRONICS CO., LTD., Suwon-si (KR)

(72) Inventors: Yoshiyuki Oishi, Morioka (JP); Ryosuke Kamitani, Yokohama (JP); Tomoyuki Kikuchi, Yokohama (JP); Yukika Yamada, Yokohama (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 107 days.

(21) Appl. No.: 16/549,885

(22) Filed: Aug. 23, 2019

(65) Prior Publication Data
US 2020/0062907 A1   Feb. 27, 2020

(30) Foreign Application Priority Data

Aug. 24, 2018  (JP) .............................. JP2018-157557
Jun. 18, 2019  (KR) ........................ 10-2019-0072259

(51) Int. Cl.
*C08G 75/04*  (2016.01)

(52) U.S. Cl.
CPC .................................. *C08G 75/04* (2013.01)

(58) Field of Classification Search
CPC .. C08G 75/04; H01L 51/0067; H01L 51/0072
See application file for complete search history.

(56) References Cited

U.S. PATENT DOCUMENTS

| | | |
|---|---|---|
| 6,569,916 B2 | 5/2003 | Kim |
| 8,520,124 B2 | 8/2013 | Ozaki |
| 9,036,275 B2 | 5/2015 | Fukuta et al. |
| 9,243,110 B2 | 1/2016 | Nishimura et al. |

(Continued)

FOREIGN PATENT DOCUMENTS

| | | |
|---|---|---|
| JP | 3146334 B2 | 3/2001 |
| JP | 2002255945 A | 9/2002 |

(Continued)

*Primary Examiner* — Shane Fang
(74) *Attorney, Agent, or Firm* — Cantor Colburn LLP

(57) ABSTRACT

A triazine ring-containing polymer including a repeating unit represented by Formula (1) and having a number average molecular weight of greater than about 20000 g/mol and less than or equal to about 50000 g/mol:

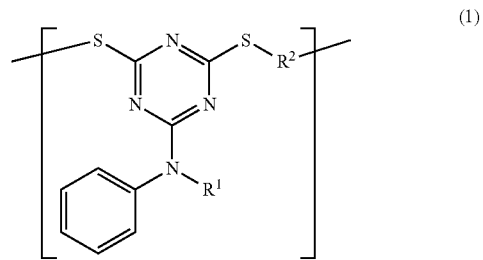

(1)

wherein, in Formula (1), $R^1$ is each independently a C1 to C5 alkyl group and $R^2$ is each independently a divalent group having at least one aromatic hydrocarbon group.

6 Claims, 1 Drawing Sheet

(56) References Cited

U.S. PATENT DOCUMENTS

| | | |
|---|---|---|
| 9,469,729 B2 | 10/2016 | Nishimura et al. |
| 9,823,443 B2 | 11/2017 | Lee et al. |
| 10,174,164 B2 | 1/2019 | Nishimura et al. |
| 2016/0068635 A1* | 3/2016 | Daily ................ C08G 73/0644 528/373 |

FOREIGN PATENT DOCUMENTS

| | | | |
|---|---|---|---|
| JP | 2007204739 | A | 8/2007 |
| JP | 2008045109 | A | 2/2008 |
| JP | 2009001658 | A | 1/2009 |
| JP | 2009029939 | A | 2/2009 |
| JP | 2009197178 | A | 9/2009 |
| JP | 2012097175 | A | 5/2012 |
| JP | 5086844 | B2 | 11/2012 |
| JP | 5118854 | B2 | 1/2013 |
| JP | 2014141596 | A | 8/2014 |
| JP | 2014162829 | A | 9/2014 |
| JP | 2014162830 | A | 9/2014 |
| JP | 2014169464 | A | 9/2014 |
| JP | 5701474 | B2 | 4/2015 |
| JP | 5742852 | B2 | 5/2015 |
| JP | 2015091919 | A | 5/2015 |
| JP | 5885256 | B2 | 3/2016 |
| JP | 5020468 | B2 | 11/2016 |
| JP | 5061015 | B2 | 1/2017 |
| JP | 5100021 | B2 | 3/2017 |
| KR | 101580748 | B1 | 12/2015 |
| KR | 1020160112307 | A | 9/2016 |
| WO | 2011021271 | A1 | 2/2011 |

\* cited by examiner

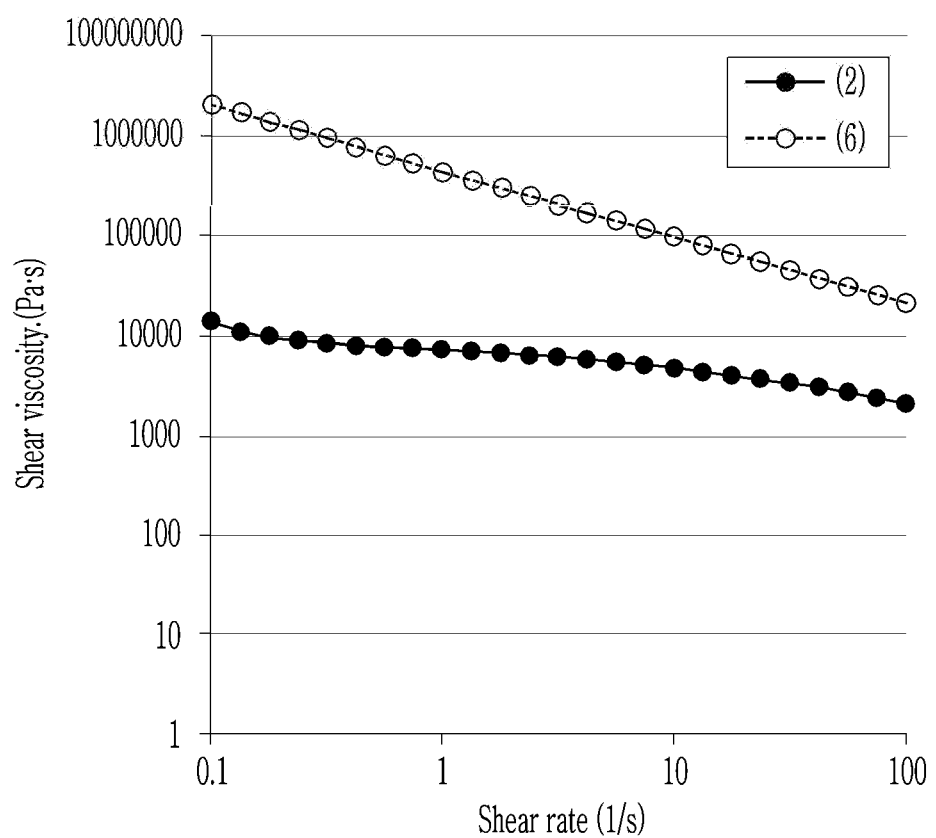

TRIAZINE RING-CONTAINING POLYMER, AND THERMOPLASTIC ARTICLE AND OPTICAL COMPONENT INCLUDING THE SAME

CROSS-REFERENCE TO RELATED APPLICATIONS

This application claims priority to Japanese Patent Application No. 2018-157557 filed on Aug. 24, 2018, in the Japan Patent Office and Korean Patent Application No. 10-2019-0072259 filed in the Korean Intellectual Property Office on Jun. 18, 2019, and all the benefits accruing therefrom under 35 U.S.C. § 119, the entire contents of which are incorporated herein by reference.

BACKGROUND

1. Field

A triazine ring-containing polymer and a thermoplastic article and an optical component are disclosed.

2. Description of the Related Art

Due to recent progress in the research of optical materials, there is a growing desire for the development of an optical material having a high refractive index and excellent heat resistance, light transparency, and reverse formability. Such optical materials can be used as an optical lens in an optical system for various electronics such as a camera, a video camera, and the like, or a smart phone, or the like. Compared with a glass lens, a resin (polymer) lens is light and not easily breakable, has a low material cost, and may be processed into various shapes through injection molding, which is appropriate for forming a lens. However, the development of a material having a high refractive index is needed due to a growing desire for thinner products or cameras having a higher pixel count.

In order to develop a polymer having a high refractive index as a resin material, an attempt to introduce an aromatic ring, a halogen atom, and a sulfur atom is being made. Specifically, a sulfur atom may be introduced to obtain an episulfide resin (polymer), a thio urethane resin, and the episulfide polymer compound. The thio urethane polymer has a refractive index of greater than or equal to about 1.7 but no plasticity and thus is limited in terms of its practical use.

A triazine ring-containing polymer resin with a high refractive index and having a high plasticity has been investigated. For example, Japanese Patent Laid-Open Publication No. 2014-162829 and Japanese Patent Laid-Open Publication No. 2014-162830 discloses a triazine ring-containing polymer including a repeating unit structure having a triazine ring and having a refractive index of greater than or equal to about 1.7.

SUMMARY

However, the polymer having a triazine ring disclosed in prior art has a problem that it is difficult to perform molding by injection molding or the like because its glass transition temperature (Tg) and viscosity at the time of melting are high.

Accordingly, the present disclosure provides a triazine ring-containing polymer having a high refractive index and that is desirable for a molding process such as injection molding.

A triazine ring-containing polymer according to an embodiment includes a repeating unit represented by Formula (1) and has a number average molecular weight of greater than about 20000 grams per mole (g/mol) and less than or equal to about 50000 g/mol:

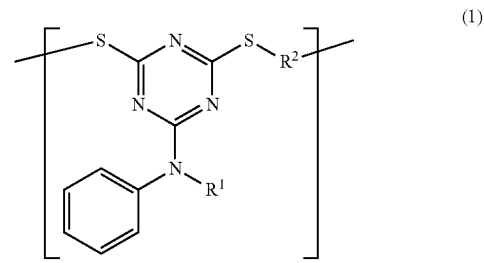

wherein, in the formula, $R^1$ is each independently a C1 to C5 alkyl group and $R^2$ is each independently a divalent group having at least one aromatic hydrocarbon group.

The $R^2$ may each independently be one of the following groups:

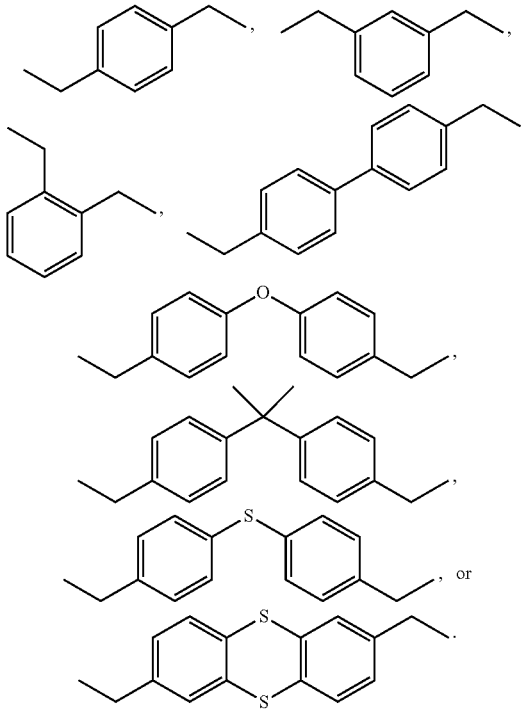

The triazine ring-containing polymer may have a glass transition temperature of greater than or equal to about 100 degree Celsius (° C.) and less than or equal to about 180° C.

In Formula (1), $R^1$ may be a methyl group and $R^2$ may each independently be one of the following groups:

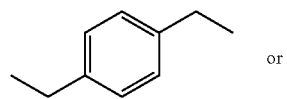

-continued

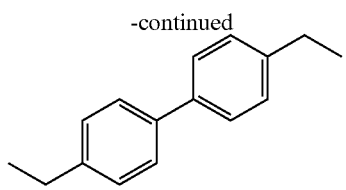

According to another embodiment, a thermoplastic article and optical component including the triazine ring-containing polymer are provided.

The triazine ring-containing polymer has a high refractive index and is desirable for a molding process such as injection molding.

BRIEF DESCRIPTION OF THE DRAWINGS

The FIGURE is a graph showing a shear viscosity versus a shear rate of the triazine ring-containing polymers obtained in Example 1 and Comparative Example 3.

DETAILED DESCRIPTION

Hereinafter, embodiments of the present disclosure will be described in detail, and may be easily performed by a person having an ordinary skill in the related art. However, this disclosure may be embodied in many different forms, and is not to be construed as limited to the example embodiments set forth herein.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The scope of the present disclosure is defined by the scope of claims, and the other aspects are the same. As used herein, "X to Y" indicating the range means "greater than or equal to X and less than or equal to Y". Also, unless otherwise mentioned, operation and properties and the like measurements are made under conditions of room temperature (about 20° C. to about 25° C.)/relative humidity (RH) 40 to 50% RH. As used here, "triazine ring-containing polymer" may be simply referred to as "polymer" and "thermoplastic article" may be simply referred to as "article." As used herein, a "C1-C5 alkyl group" means a linear, branched, or cyclic alkyl group.

A triazine ring-containing polymer according to an embodiment includes a repeating unit represented by Formula (1):

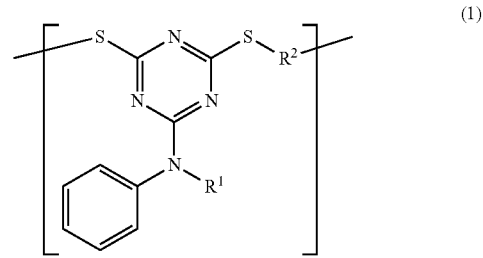

(1)

wherein, in Formula (1), $R^1$ is each independently a C1 to C5 alkyl group and $R^2$ is each independently a divalent group having at least one aromatic hydrocarbon group.

A nitrogen (N) of a side chain of the triazine ring-containing polymer is attached with a phenyl group. In addition, a main chain of the polymer is connected by a thio ether bond (—S—). The phenyl group of the side chain and the thio ether bond of the polymer main chain are expected to provide the polymer with a higher refractive index. In addition, by introducing the phenyl group to the side chain, a glass transition temperature of the polymer may be controlled within the range appropriate for the injection molding (for example, 80°-200° C.).

The C1 to C5 alkyl group bound to the N of the side chain may be a methyl group, an ethyl group, a n-propyl group, an isopropyl group, a n-butyl group, an isobutyl group, a sec-butyl group, a tert-butyl group, a n-pentyl group, an isopentyl group, a neopentyl group, a sec-pentyl group, a 3-pentyl group, a tert-pentyl group, a cyclopentyl group, or any other linear, branched, or cyclic alkyl group. In an embodiment, a C1 to C4 alkyl group is desirable, a C1 to C3 alkyl group is more desirable, a methyl group or an ethyl group is even more desirable, and a methyl group is most desirable. By including the alkyl group, the glass transition temperature may be decreased, and the viscosity at the melting temperature may be also decreased, compared with polymers wherein a hydrogen atom is present instead of the C1 to C5 alkyl group. In addition, by including the alkyl group, the solubility in a solvent may be improved, compared with the polymers having other groups instead of the C1 to C5 alkyl group.

The divalent group ($R^2$) having at least one aromatic hydrocarbon group positioned in the main chain of the polymer may include an aromatic group having only carbon and hydrogen in an aromatic ring, for example phenyl, naphthyl, anthracyl, and the like. The aromatic hydrocarbon group may optionally have other groups present, e.g., alkyl groups, such as C1 to C10 alkyl groups; alkenyl groups, such as C2 to C10 alkenyl groups; alkynyl groups, such as C2 to C10 alkynyl group; or a heteroatom, e.g., sulfur (S) oxygen (O); or a combination thereof. The aromatic hydrocarbon group may have a total of 6 to 60 carbon atoms, or 6 to 40 carbon atoms, or 2 to 20 carbon atoms. In an aspect, the divalent group ($R^2$) having at least one aromatic hydrocarbon group positioned in the main chain of the polymer may include a divalent group having an aromatic hydrocarbon group; a divalent group having an aromatic hydrocarbon group and an aliphatic hydrocarbon group, e.g., 1-4 C1 to C6 alkyl groups; a divalent group having an aromatic hydrocarbon group, at least one aliphatic hydrocarbon group, e.g., 1-4 C1 to C6 alkyl groups, and an —S— or —O—; or the like. Specific examples are the following groups.

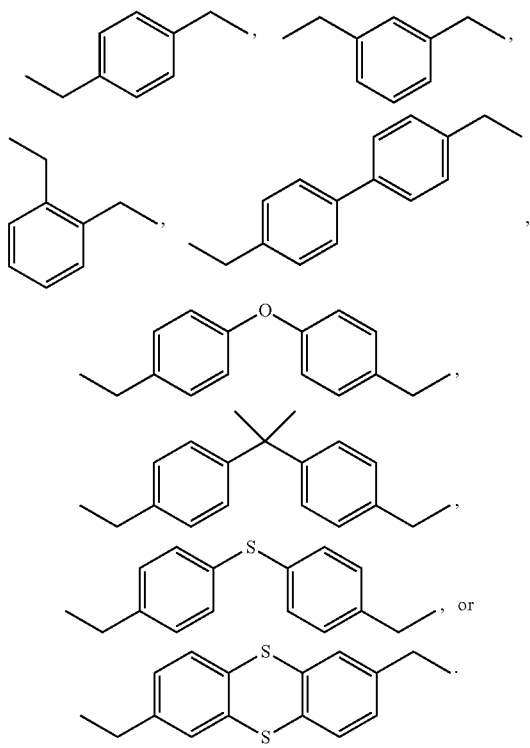

By introducing the divalent group having at least one aromatic hydrocarbon group to the main chain of the polymer, the polymer may have a higher refractive index. Simultaneously, the glass transition temperature of the polymer may be adjusted to be within a range appropriate for the injection molding (for example, 80° C. to 200° C.).

According to an embodiment, a triazine ring-containing polymer includes one or both of the following repeating units:

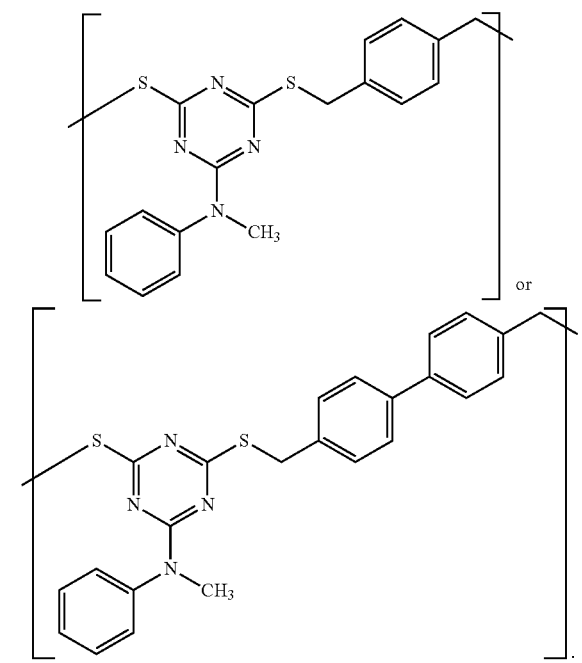

Although the triazine ring-containing polymer may include a repeating unit (hereinafter, referred to as "other repeating unit") in addition to the repeating unit represented by Formula (1), it is also possible not to include the other additional repeating unit in order to obtain the desired properties described herein. If including other additional repeating units, a ratio of a number of the other additional repeating units to the total number of the repeating units may be less than or equal to about 10%, for example, less than or equal to about 5%, less than or equal to about 3%, or less than or equal to about 1% (lowest ratio: 0%). When the ratio of the other additional repeating units is within the range, it may prevent deterioration of the refractive index and improve the forming process such as injection molding.

When the triazine ring-containing polymer includes at least two types of repeating units, which is a copolymer, the arrangement type of the repeating units is not particularly limited, but may be random-type or block-type.

A number average molecular weight (Mn) of the triazine ring-containing polymer is necessarily greater than about 20000 g/mol and less than or equal to about 50000 g/mol, for example, greater than or equal to about 20500 g/mol and less than or equal to about 49000 g/mol, or greater than or equal to about 21000 g/mol and less than or equal to about 48000 g/mol. When the number average molecular weight is less than or equal to about 20000 g/mol, a viscosity is excessively low; on the contrary, when the number average molecular weight is greater than about 50000 g/mol, the viscosity is excessively high, as a result the forming workability such as injection molding is deteriorated. In an embodiment, when the number average molecular weight is within the range, a molded article may have particularly excellent transmittance (transparency) or heat resistance, and also the obtained molded article has excellent mechanical strength. A method of controlling the number average molecular weight within the numeric range is not particularly limited, but the value may be controlled by adjusting a polymerization time within about 10 minutes to about 40 hours. Also, as used herein, the number average molecular weight means a value measured by the method described in Examples which are described below.

A refractive index ($n_d$) of the triazine ring-containing polymer is, for example, greater than or equal to about 1.65, or greater than or equal to about 1.7. In the range, it may obtain a molded article having an improved refractive index which is appropriate to an optical component. Abbe number ($v_d$) of the triazine ring-containing polymer is, for example, greater than or equal to about 15 or greater than or equal to about 18. The refractive index $n_d$ and the abbe number $v_d$ are measured according to a method which will be described in Examples later.

The triazine ring-containing polymer has a glass transition temperature. In other words, a point of inflection is observed in a differential caloric curve obtained by a differential scanning calorimetry. The resin having the glass transition temperature is thermoplastic and may be processed by injection molding. The glass transition temperature of the triazine ring-containing polymer may be greater than or equal to about 80° C. and less than or equal to about 200° C., for example, greater than or equal to about 100° C. and less than or equal to about 180° C. The glass transition temperature may be adjusted by controlling a structure of the repeating unit represented by Formula (1). For example, the glass transition temperature may be increased by introducing a bulky or a rigid structure into $R^2$ of Formula (1). The glass transition temperature is measured by the method which will be described in Examples later.

A viscosity at the time of melting of the triazine ring-containing polymer is greater than or equal to about 100 pascal second (Pa·s) and less than about 100000 Pa·s, for example, greater than or equal to about 1000 Pa·s and less than or equal to about 50000 Pa·s or greater than or equal to about 6000 Pa·s and less than or equal to about 30000 Pa·s. When viscosity at the time of melting is within the numeric range, it may have excellent article-forming workability such as injection molding. The viscosity at the time of melting is measured by the method which will be described in Examples later.

The triazine ring-containing polymer may be synthesized using the disclosed method. For example, it may be prepared by reacting the triazinedithiol compound and the dihalogenated aromatic compound in presence of a phase-transfer catalyst as shown in the Scheme 1.

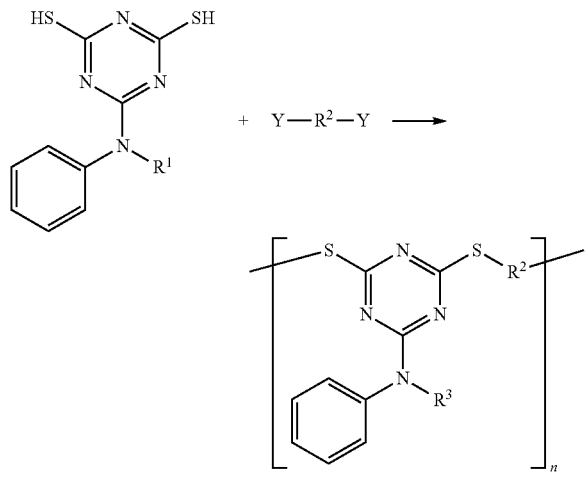

Scheme 1

In the Scheme 1, $R^1$ and $R^2$ are the same as defined in Formula (1) and Y is a halogen atom.

The halogen atom of Y may include a fluorine atom, a chlorine atom, a bromine atom, and an iodine atom.

The triazinedithiol compound may include, but is not limited to, for example 2-N-methyl anilino-1,3,5-triazine-4,6-dithiol, 2-N-ethyl anilino-1,3,5-triazine-4,6-dithiol, 2-N-n-propyl anilino-1,3,5-triazine-4,6-dithiol, 2-N-isopropyl anilino-1,3,5-triazine-4,6-dithiol, and the like. The dihalogenated aromatic compound may include, for example, α,α'-dibromo-p-xylene, α,α'-dichloro-p-xylene, α,α'-dibromo-o-xylene, α,α'-dichloro-o-xylene, α,α'-dibromo-m-xylene, α,α'-dichloro-m-xylene, 4,4'-bis(bromomethyl)biphenyl, 4,4'-bis(chloromethyl)biphenyl, and the like. These may be used alone or in combination of two or more.

A long-chain alkyl quaternary ammonium salt and a crown ether that can be used as the phase-transfer catalyst for the reaction between the triazine dithiol compound and the dihalogenated aromatic compound, and for example hexadecyltrimethylammonium bromide may be preferably used.

The reaction system may include a two-phase system of water and an organic solvent, for example a two-phase system of an organic solvent such as chloroform, dichloromethane, benzonitrile, nitrobenzene, and the like and water. Once the reaction starts, a base such as sodium hydroxide, potassium hydroxide, and the like may be added, and the reaction may be performed at about −10° C. to about 100° C. for about 2 hours to about 120 hours.

The obtained triazine ring-containing polymer may be purified by a generally known purifying method, such as a reprecipitation method, a dialysis method, an ultrafiltration method, and the like.

Thermoplastic Article and Optical Component

Another embodiment of the present disclosure provides a thermoplastic article which includes the aforementioned triazine ring-containing polymer. Another embodiment of the present disclosure provides an optical component which includes the aforementioned triazine ring-containing polymer.

A shape of the article is not particularly limited but any type, for example, lens-type (spherical lens, non-spherical lens, Fresnel lens, and the like), film-type, sheet-type, plate-type, bar-type, fiber-type, prism-type, and the like. The article may be manufactured, for example, using a well-known method such as an injection molding method, a compression molding method, an extrusion method, a transfer method, a blow method, a pressure method, a coating method (a spin coating method, a roll coating method, a curtain coating method, a dip coating method, a casting method, and the like) and the like. The composition of the present embodiment is particularly appropriate for the injection molding. Before forming the article, a kneading apparatus such as a Henschel mixer, a kneader, a Banbury mixer, an extruder, and the like may be used to mix raw materials. When the injection molding is adopted, a cylinder temperature may be, for example, greater than or equal to about 150° C. and less than or equal to about 300° C. and a molding temperature of greater than or equal to about 50° C. and less than or equal to about 100° C.

The optical component may be appropriately used as an optical component transmitting light (a passive optical component) in a display (for example, a display for a smart phone, a liquid crystal display, a plasma display, and the like), an imaging system (for example, a camera, a video, and the like), an optical pickup, a projector, an optical fiber communication equipment (for example, an optical amplifier and the like), a head lamp for a vehicle, and the like. These optical components may include, for example, a lens, a film, an optical waveguide, a prism, a prism sheet, a panel, an optical disk, a sealant of LED, and the like. These optical components may have, various functional layers such as an anti-reflection layer, a light absorption layer, a hard coating layer, an antiglare layer, and the like.

EXAMPLES

Hereinafter, the present disclosure will be described in detail with reference to examples, but they are not intended to limit the present disclosure. In the following description, "part" refers to "mass by part."

Measurement Method of Properties

Number Average Molecular Weight (Mn) and Weight Average Molecular Weight (Mw)

A measurement sample is prepared by dissolving a polymer in tetrahydrofuran (THF) to have a concentration of 0.1 mass % and filtering the solution with a polytetrafluoroethylene membrane filter having a pore size of 0.2 micrometer (μm). A number average molecular weight and a weight average molecular weight of the sample are measured through gel permeation chromatography (GPC) using tetrahydrofuran as a mobile phase with a differential refractometer as a detector. Monodisperse polystyrene is used as a molecular weight standard. Units for molecular weight as used herein are grams per mole (g/mol).

Glass Transition Temperature (Tg)

A glass transition temperature (Tg) of the sample is measured with a differential scanning calorimeter (DSC) by increasing a temperature up to about 300° C. at a temperature increase rate of about 10° C./min, maintaining the sample there for about 10 minutes, cooling it down to about 25° C. at a temperature decrease rate of about 10° C./min, maintaining it there for about 10 minutes, and then, increasing the temperature up to about 300° C. at a temperature increase rate of about 10° C./min. After completing the measurement, it is cooled until a room temperature (25° C.) at 10° C./minute.

Refractive Index $n_d$ and Abbe Number $v_d$ 2 g of the polymer is compression-molded for 5 minutes under the conditions of 200° C. and 10 megapascal (MPa) to provide a forming plate having a length 3 centimeters (cm)×a width 3 cm and a thickness 0.5 millimeters (mm). The obtained forming plate is measured for a refractive index at wavelengths of 473 nanometers (nm), 594 nm, 657 nm using a prism coupler (Model2010, manufactured by Metricon). Refractive indexes at C-ray (656.3 nm), d-ray (587.6 nm), F-ray (486.1 nm) are calculated from the measured values. Abbe number $v_d$ is calculated using the refractive index at three wavelengths.

Measurement of Rheology

The viscosity at the time of melting of the polymer is measured using a rheometer (MCR302, manufactured by Anton Paar) under a nitrogen atmosphere, at 250° C. and at a shear rate of 0.1 (1/s).

Synthesis of Triazine Ring-Containing Polymer

Example 1

200 grams (g) (1.08 mole, mol) of cyanuric chloride and 1 liter (L) of tetrahydrofuran are added into a 2 L three-necked flask mounted with 500 milliliters (mL) dropping funnel and cooled at 0° C. in an ice bath. 300 mL tetrahydrofuran solution of 116.23 g (1.08 mol) of N-methyl aniline is added by a dropping funnel in a dropwise manner for 120 minutes. After the addition, 300 mL of an aqueous solution of 115 g sodium carbonate is added, and the resulting mixture is stirred for 30 minutes. The upper tetrahydrofuran layer is taken out, and the solvent is removed under a reduced pressure distillation to provide 263 g (yield: 95%) of 2-N-methyl anilino-4,6-dichloro triazine.

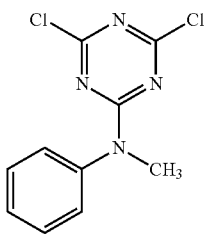 [SMILES: CN(c1ccccc1)c1nc(Cl)nc(Cl)n1]

Continuously, in a 1 L three-necked flask with a nitrogen inlet and a 200 mL dropping funnel 100 g (392 millimoles, mmol) of 2-N-methyl anilino-4,6-dichloro triazine, 350 mL of N,N-dimethyl formamide (DMF), and 50 mL of distilled water are added and cooled at 0° C. in an ice bath. A solution of 103 g of hydrogen sodium monosulfide (purity: 65%, manufactured by Wako Junyaku Kogyo Co.) in 200 mL of pure water is dropwise added for 120 minutes by a dropping funnel. After the addition, the reaction solution is heated at 90° C. using an oil bath and stirred for 60 minutes. It is diluted by adding the reaction solution into 3 L distilled water, and 1 N hydrochloric acid aqueous solution is added to provide pH 3.0 or less, and then a solid is precipitated. The solid is isolated by filtration and washed with pure water to provide 83.4 g (yield: 85%) of the 2-N-methyl anilino-1,3,5-triazine-4,6-dithiol.

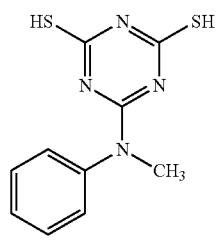 [SMILES: CN(c1ccccc1)c1nc(S)nc(S)n1]

102.1 g (408 mmol) of 2-N-methyl anilino-1,3,5-triazine-4,6-dithiol is added into a 2 L beaker and 350 mL of pure water was added, followed by the addition of 82 mL of 10M NaOH aqueous solution, the resulting mixture was heated at 50° C. 70 g (400 mmol) of α,α'-dichloro-p-xylene is dissolved in 500 mL of chloroform and then added into the aqueous solution. 7.43 g of hexadecyltrimethyl ammonium bromide is added thereto and severely agitated at 50° C. for 3 hours. The reaction solution is dropwise added in methanol to be precipitated to provide a white triazine ring-containing polymer (2). The obtained polymer has a number average molecular weight of 45000 and a weight average molecular weight of 90000.

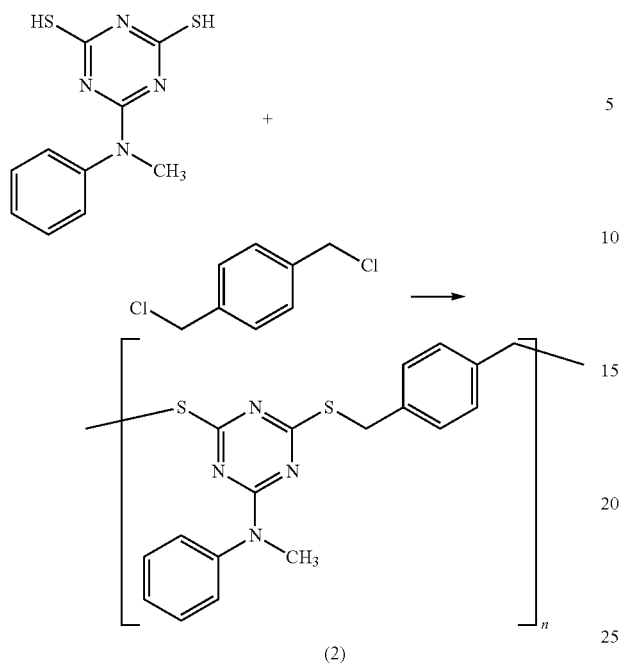

(2)

Example 2

A white triazine ring-containing polymer (3) is obtained in accordance with the same procedure as in Example 1, except that 4,4'-bis(chloro methyl)biphenyl is used instead of α,α'-dichloro-p-xylene in the polymerization reaction in Example 1. The obtained polymer has a number average molecular weight of 25000 g/mol and a weight average molecular weight of 60000 g/mol.

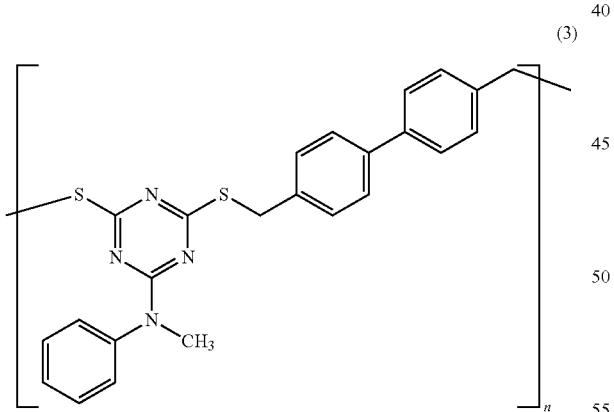

(3)

Comparative Example 1

A white triazine ring-containing polymer (4) is obtained in accordance with the same procedure as in Example 1, except that 1,4-dibromo butane is used instead of α,α'-dichloro-p-xylene in the polymerization reaction in Example 1. The obtained polymer has a number average molecular weight of 20000 g/mol and a weight average molecular weight of 52000 g/mol.

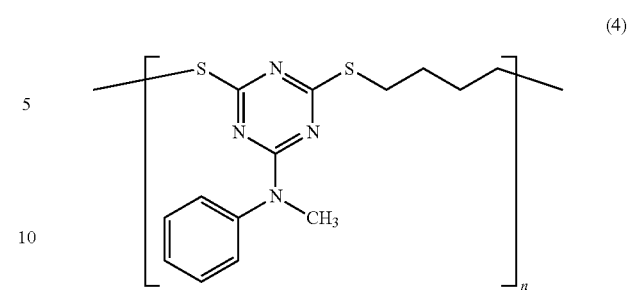

(4)

Comparative Example 2

A white triazine ring-containing polymer (5) is obtained in accordance with the same procedure as in Example 1, except that 2-dibutyl amino-1,3,5-triazine-4,6-dithiol is used instead of 2-N-methylanilino-1,3,5-triazine-4,6-dithiol in the polymerization reaction in Example 1. The obtained polymer has a number average molecular weight of 50000 g/mol and a weight average molecular weight of 120000 g/mol.

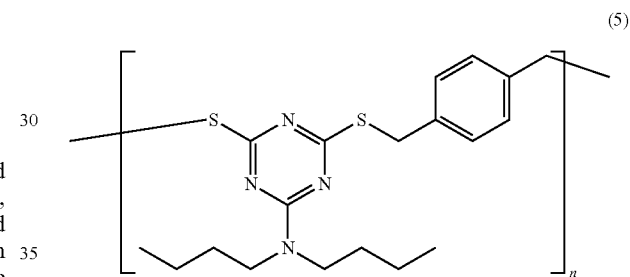

(5)

Comparative Example 3

A white triazine ring-containing polymer (6) is obtained in accordance with the same procedure as in Example 1, except that aniline is used instead of N-methylaniline in the synthesis reaction of Example 1. The obtained polymer has a number average molecular weight of 40000 g/mol, a weight average molecular weight of 78000 g/mol, and a glass transition temperature of 125° C.

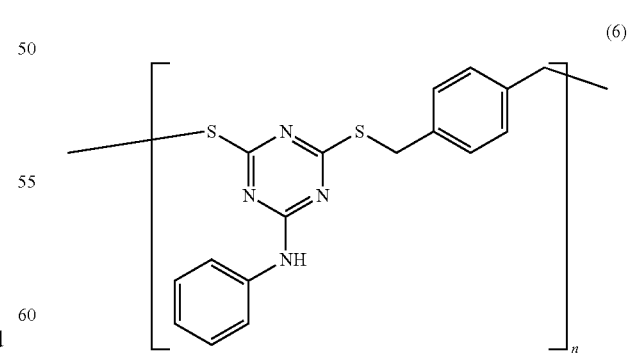

(6)

Comparative Example 4

A white triazine ring-containing polymer (7) is obtained in accordance with the same procedure as in Example 1, except that diphenyl amine is used instead of N-methylaniline in the synthesis reaction of Example 1. The obtained polymer has a number average molecular weight of 15000 g/mol and a weight average molecular weight of 40000 g/mol and is insoluble in a solvent such as tetrahydrofuran (THF), N-methyl-2-pyrrolidone (NMP), chloroform, and the like.

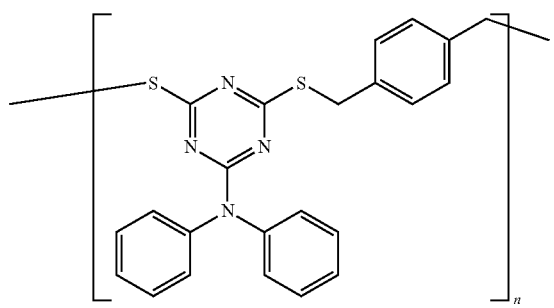

(7)

Evaluation Example 1

Glass Transition Temperature (Tg)

The triazine ring-containing polymers obtained from Examples 1, 2 and Comparative Examples 1, 2 are measured for a refractive index ($n_d$, 587.6 nm), Abbe number $v_d$, a glass transition temperature, a viscosity in a melting state according to the aforementioned method. The viscosity in a melting state is evaluated as follows: ○ refers to less than 100000 Pa·s, and x refers to greater than or equal to 100000 Pa·s. The results are shown in Table 1.

TABLE 1

| | Triazine ring-containing polymer | Refractive index $n_d$ | Abbe Number $v_d$ | Glass transition temperature (° C.) | Viscosity |
|---|---|---|---|---|---|
| Example 1 | (2) | 1.705 | 25.3 | 112 | ○ |
| Example 2 | (3) | 1.714 | 22.0 | 130 | ○ |
| Comparative Example 1 | (4) | 1.675 | 29.2 | 53 | ○ |
| Comparative Example 2 | (5) | 1.635 | 33.7 | 40 | ○ |
| Comparative Example 3 | (6) | 1.729 | 22.0 | 125 | x |

As shown in Table 1, the glass transition temperature of the polymer may be controlled within a range of 80° C.-200° C. by simultaneously having a tertiary amino side chain group, a modifying group including a phenyl group and an alkyl group, and at least one aromatic hydrocarbon group in a linker structure of the main chain.

Evaluation Example 2

The triazine ring-containing polymers obtained from Example 1 and Comparative Example 3 are measured for a viscosity in a melting state according to the aforementioned method. The results are shown in the FIGURE.

As shown in the FIGURE, the triazine ring-containing polymer (6) according to Comparative Example 3 has significantly high viscosity in a melting state and may be not injection-molded. This is estimated since a side chain of NH forms a hydrogen bond in a molecule and between molecules. When the triazine ring-containing polymer (2) according to Example 1 having a side chain of tertiary amino group and a modifying group of phenyl group and alkyl group has a low viscosity in a melting state, so is suitable for injection molding.

Evaluation Example 3

A polymer having the same molecular structure as in the polymer synthesized in Example 1 but having a different number average molecular weight is synthesized, and evaluated for a viscosity and an injection moldability. The injection moldability is evaluated as follows: "○" refers to a polymer article that may be injection-molded under a temperature condition of the injection nozzle of 250° C., where the molded article may be taken out of the mold, and "x" refers an polymer that may be not taken out since it is not injection-moldable. The results are shown in Table 2.

TABLE 2

| Number average molecular weight (Mn) | Viscosity (Pa · s) | Injection moldability |
|---|---|---|
| 13000 | 3300 | x |
| 20500 | 6000 | ○ |
| 27000 | 10000 | ○ |
| 40000 | 14000 | ○ |
| 50000 | 30000 | ○ |
| 100000 | 100000 | x |

As shown in Table 2, it is understood that the triazine ring-containing polymer having a number average molecular weight of greater than 20000 g/mol and less than or equal to 50000 g/mol is suitable for the injection molding.

As shown above, the triazine ring-containing polymer according to the present disclosure has a high refractive index and excellent forming properties, such that it is particularly suitable for uses such as a lens for a smart phone.

While this disclosure has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

What is claimed is:

1. A triazine ring-containing polymer, comprising a repeating unit represented by Formula (1), wherein the polymer has a number average molecular weight of greater than about 20000 grams per mole and less than or equal to about 50000 grams per mole:

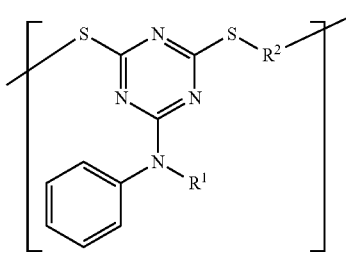

(1)

wherein, in Formula (1), $R^1$ is each independently a C1 to C5 alkyl group and $R^2$ is each independently a divalent group having at least one aromatic hydrocarbon group.

2. The triazine ring-containing polymer of claim 1, wherein the $R^2$ is each independently one of the following groups:

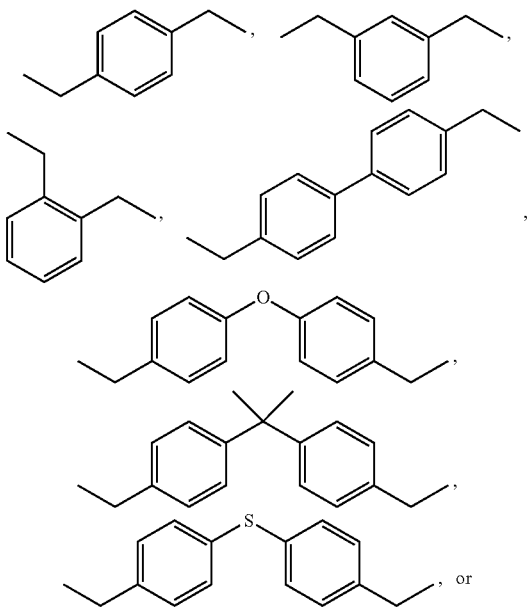

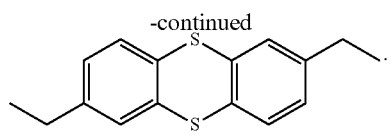

3. The triazine ring-containing polymer of claim 1, which has a glass transition temperature of greater than or equal to about 100° Celsius and less than or equal to about 180° Celsius.

4. The triazine ring-containing polymer of claim 1, wherein in Formula (1), $R^1$ is a methyl group and $R^2$ is each independently one of the following groups:

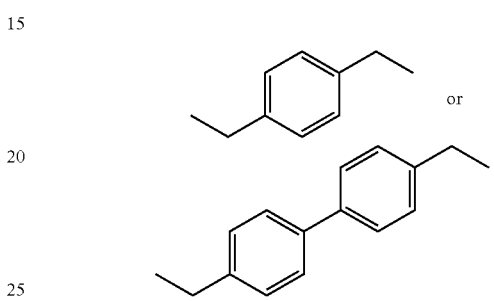

5. A thermoplastic article comprising the triazine ring-containing polymer of claim 1.

6. An optical component comprising the triazine ring-containing polymer of claim 1.

* * * * *